United States Patent [19]

Mashiyama

[11] Patent Number: 4,914,621
[45] Date of Patent: Apr. 3, 1990

[54] DOCUMENT PROCESSING SYSTEM
[75] Inventor: Tomio Mashiyama, Tokyo, Japan
[73] Assignee: Canon Kabushiki Kaisha, Tokyo, Japan
[21] Appl. No.: 883,995
[22] Filed: Jul. 10, 1986
[30] Foreign Application Priority Data Jul. 15, 1985 [JP] Japan ............................ 60-154224

[51] Int. Cl.⁴ .................................................. G06F 1/00
[52] U.S. Cl. ................................... 364/900; 364/930; 364/930.4
[58] Field of Search ... 364/200 MS File, 900 MS File; 400/61, 279, 293, 347, 76, 322, 555, 568, 63, 611

[56] References Cited

U.S. PATENT DOCUMENTS

| | | | |
|---|---|---|---|
| 4,007,442 | 2/1977 | Findley et al. | 400/63 |
| 4,059,833 | 11/1978 | Kitamura et al. | |
| 4,175,851 | 11/1979 | Kitamura et al. | |
| 4,207,011 | 6/1980 | Pascoe | 400/76 |
| 4,222,643 | 9/1980 | Kitamura et al. | |
| 4,232,954 | 11/1980 | Kitamura et al. | |
| 4,252,451 | 2/1981 | Clancy et al. | 400/322 |
| 4,403,898 | 9/1983 | Hosogaya | 400/585 |
| 4,416,558 | 11/1983 | McInroy et al. | 364/900 |
| 4,447,888 | 5/1984 | Kuecker et al. | 364/900 |
| 4,450,453 | 5/1984 | Kitamura et al. | |
| 4,452,136 | 6/1984 | Boynton et al. | 364/900 |
| 4,558,965 | 12/1985 | Ueda et al. | |
| 4,565,461 | 1/1986 | Usui et al. | 400/611 |
| 4,576,490 | 3/1986 | Isobe | 400/322 |
| 4,615,631 | 10/1986 | Ueda et al. | |
| 4,624,591 | 11/1986 | Barnes et al. | 400/347 |
| 4,786,894 | 11/1988 | Furasawa et al. | 400/63 |
| 4,799,811 | 1/1989 | Beck et al. | 400/322 |

Primary Examiner—Gareth D. Shaw
Assistant Examiner—Rebecca L. Rudolph
Attorney, Agent, or Firm—Fitzpatrick, Cella, Harper & Scinto

[57] ABSTRACT

A document processing system includes an input device for inputting into the system document information, including line pitch information relating to lines of the document information. The document information is divided into at least two regions. Also provided is a document memory for storing the document information. The system also includes a line pitch information memory for storing a plurality of line pitch information relating to the lines of the document information in each of the regions. Also included are first and second deriving devices. The first deriving device derives, in accordance with line pitch information relating to one of the regions, a position of the line to be printed subsequently in one of the regions. The second deriving device derives, in accordance with the line pitch information relating to the other one of the region, a position of the line to be printed subsequently in the other one of the regions. The system also includes a device for deciding the sequence of printing of the lines in accordance with each of the position information derived respectively by the first and second deriving devices regardless of the region to which each line belongs. The system also includes a printer for effecting printing in accordance with the sequence deciding by the deciding device.

12 Claims, 16 Drawing Sheets

DOCUMENT PROCESSING SYSTEM

BACKGROUND OF THE INVENTION

1. Field of the Invention

The present invention relates to a document processing system and, more particularly, to a document processing system having a French-fold printing function in which the contents of two pages of a document are printed on the left and right halves of a single sheet of paper. The term "document" used in this specification should be interpreted to generally mean various types of documents which may include at least one figure or image. The system of the invention may be composed of a plurality of separate devices, or it may be constructed as a unit.

2. Description of the Prior Art

Document processing systems such as word processors are known. These processing systems have various printing functions. One of these known printing functions is the so-called French-fold printing function in which the contents of two pages of a document formed by the processing system are printed on the left and right halves of a single sheet of paper. It is assumed here that the thus-formed document is stored in a document memory as two pages, i.e., a first page 20 and a second page 21, as shown in FIG. 2. FIG. 3 shows the result of French-fold printing on a single paper sheet 30. It will be seen that the contents of the first page 20 and the second page 21 are printed on the left and right halves of the paper 30, respectively.

Most of the document processing systems of this kind employ serial printers such as wire dot-matrix printers or thermal printers. Such a serial printer is usually designed so that it prints in a line-by-line fashion. In the French-fold printing mode, therefore, the printer prints the corresponding lines of both pages, e.g., the ith line of the left page and the ith line of the right page, in a single stroke. For instance, in the illustrated case, the third line 40 on the left page and the third line 41 on the right page are formed into a dot pattern 42 as shown in FIG. 4, and the printer operates in response to this pattern to print those lines in one stroke.

Some of the document processing systems of the type described above have a function which enables the user to select the line feed or change pitch for each line. When printing is conducted by such a system in the French-fold printing mode, it is impossible to print the corresponding lines of both pages with independently changing line pitches. In other words, when a changed line pitch is selected for one of the two pages, the printing of the other page is inevitably conducted with that changed line pitch. In the French-fold printing mode, therefore, the user cannot enjoy the advantage of the function of selecting a changed line pitch for each line.

The editing of a document often requires that the printhead is located in relation to a print position on the preceding line, but only on the left or right page. In other cases, both pages are treated as a single page and the printhead is located in relation to a print position on the preceding line which is composed of corresponding lines of two successive pages. Unfortunately, known document processing systems cannot meet these requirements.

SUMMARY OF THE INVENTION

Accordingly, it is a primary object of the invention to provide a document processing system in which the print position of each line in a plurality of blocks, such as left and right pages, can be controlled so as to enable the selection of the line pitch for each line, while eliminating the necessity for a large-capacity image memory, thereby overcoming many of the problems of known document processors.

As a measure for achieving such an object, according to the invention, there is provided a document processing system which comprises: an input means for inputting document information; a document memory means for storing document information; document line memory means for storing document line information; deciding means for determining the printing sequence of lines in accordance with the document line information; and printing means for printing the lines of the document in the determined sequence.

The document processing means of the invention has a function of controlling the direction and speed of feed of a sheet of paper to be printed upon, as well as the printhead position, so as to enable the printhead to be located at any desired position near a designated printed position for the purpose of erasing a printed character, synthesizing of a figure, forming an ornamental frame, and so forth. Namely, the printhead can be located at any desired position by backward tracing of the printing. The document processing system of the invention can have a relocating function for relocating the printhead at the current printing position after the backward tracing. The backward tracing may be conducted serially over two pages, as in the case of French-fold printing or, alternatively, for each of the left and right pages independently.

According to the invention, the document information stored in the document memory means is divided into a plurality of regions or blocks. For each of such regions or blocks, provided are a document line information memory region which stores information peculiar to the document region such as line addresses, a pointer for pointing to the line print position, character codes, line changing pitch and a paginating flag, as well as a pointer for indicating the current position of the printhead. With this arrangement, the printing is commenced with the line which is the closest to the line on which the printhead is positioned, as viewed in the direction perpendicular to the direction of the print line, through the plurality of blocks in a parallel fashion.

DESCRIPTION OF THE PREFERRED EMBODIMENT

Figure 1:
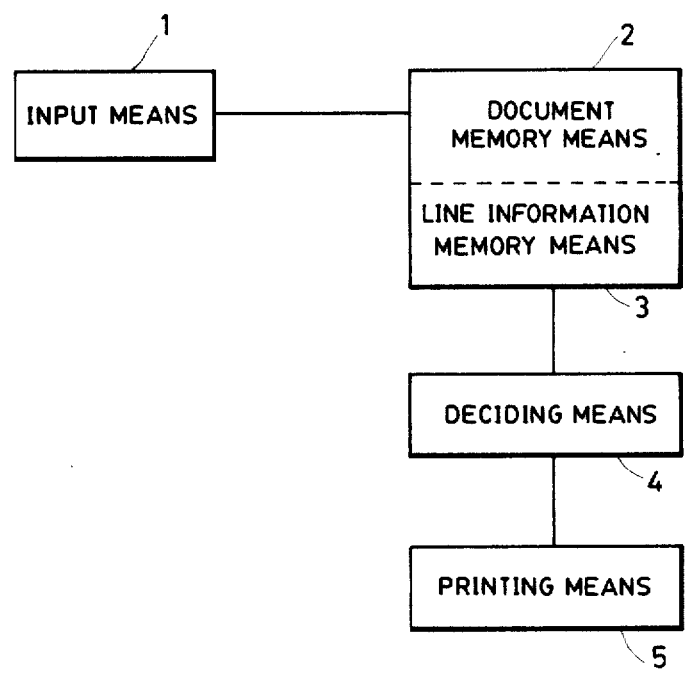
FIG. 1 is a schematic illustration of a document processing system in accordance with the invention.
Figure 2:
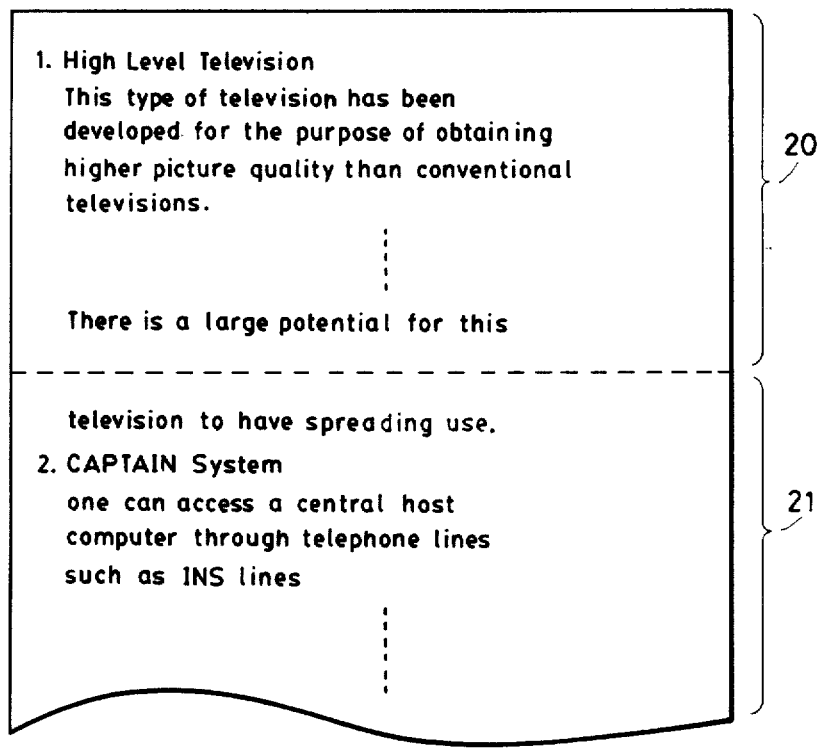
FIG. 2 is an illustration of an example of document data.
Figure 3:
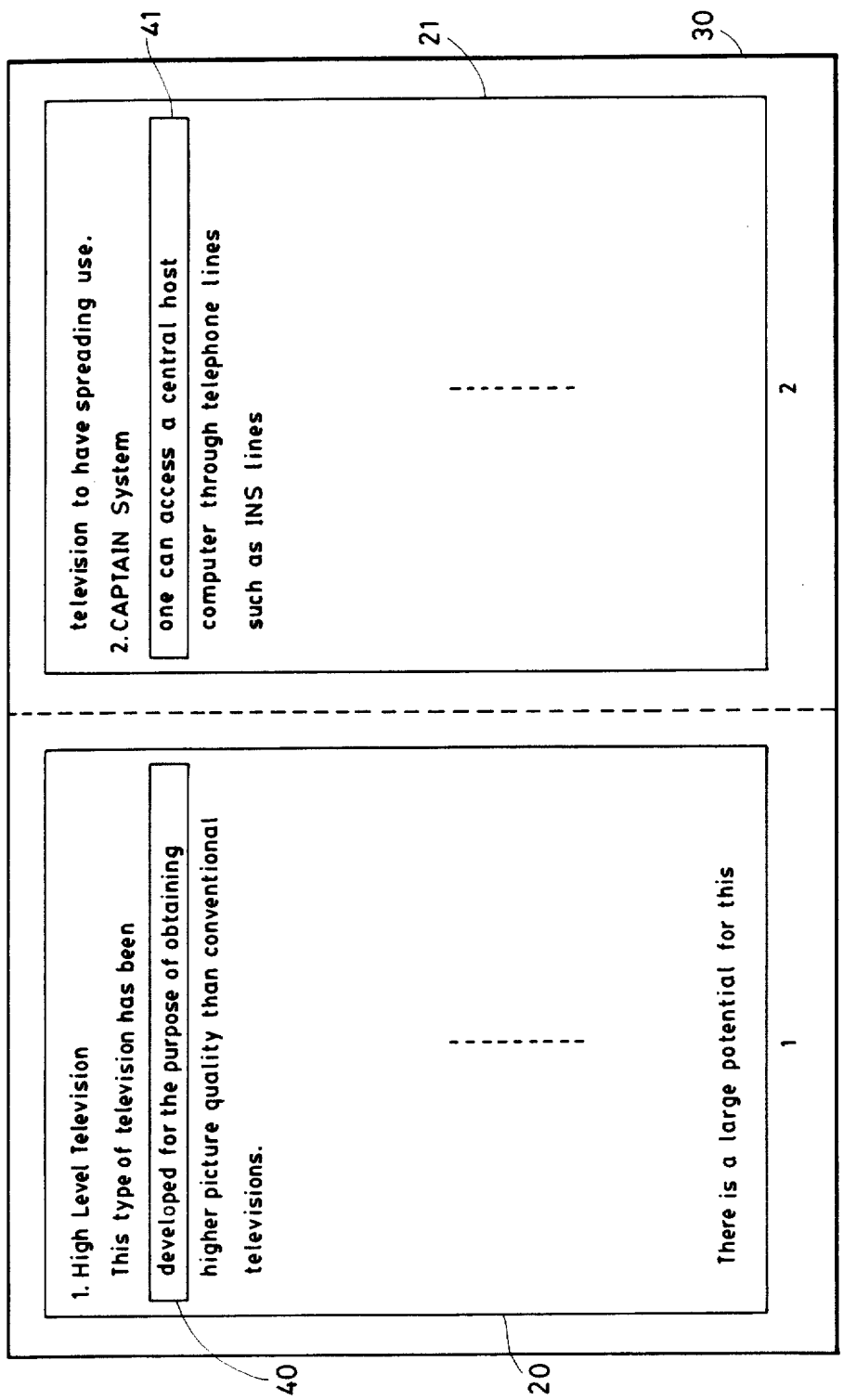
FIG. 3 is an illustration of an example of the result of printing of the document data shown in FIG. 2, the printing being in the French-fold printing mode.
Figure 4:
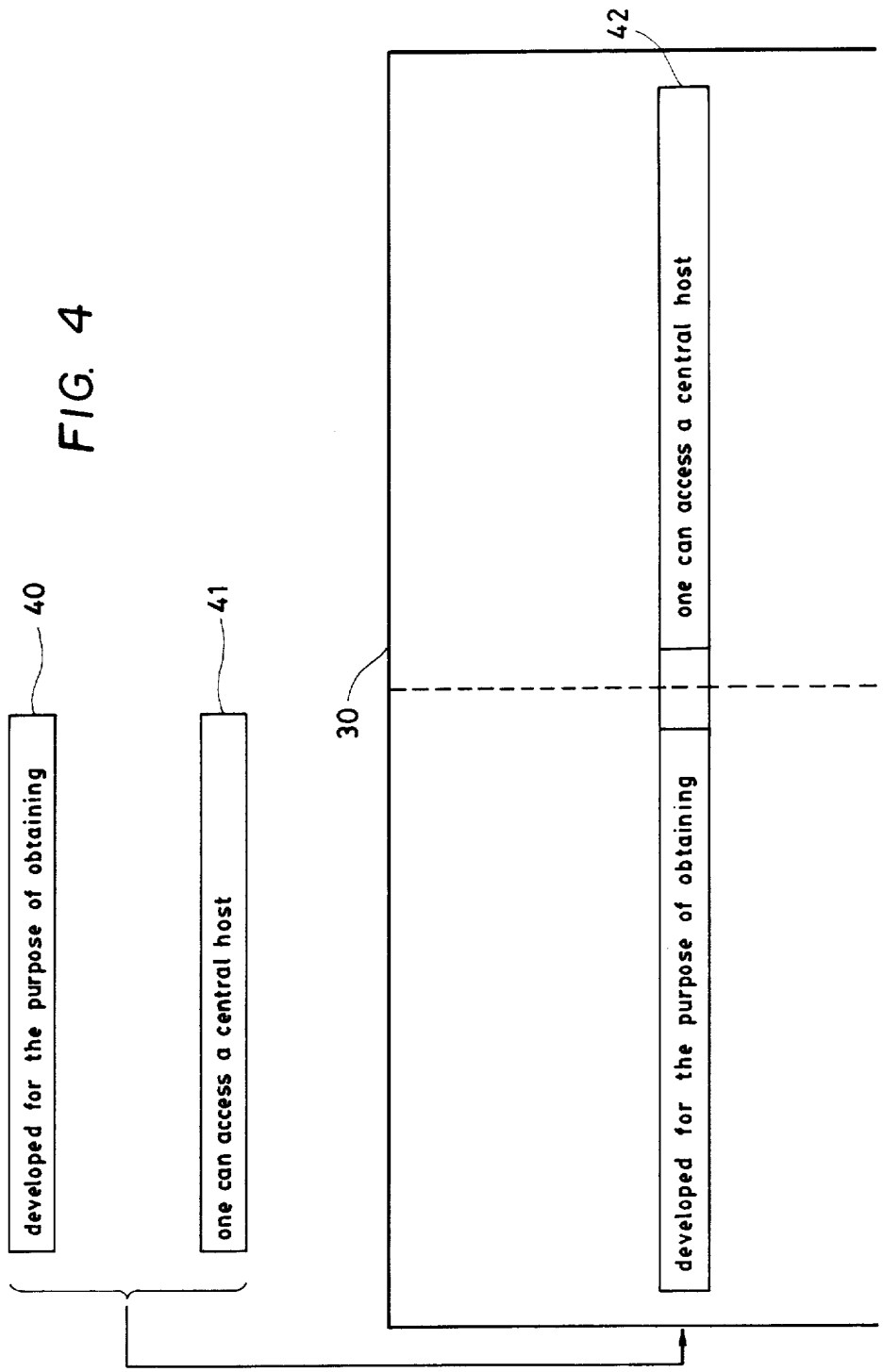
FIG. 4 is an illustration of the relationship between corresponding lines printed on left and right pages.

Referring first to FIG. 1, a document processing system in accordance with the invention includes a document input means 1, a document memory means 2 for storing document information, a document line memory means 3 for storing document line information, a deciding means 4 for determining the sequence of movements of the printhead, and a printing means 5 for conducting the printing.

Figure 5:
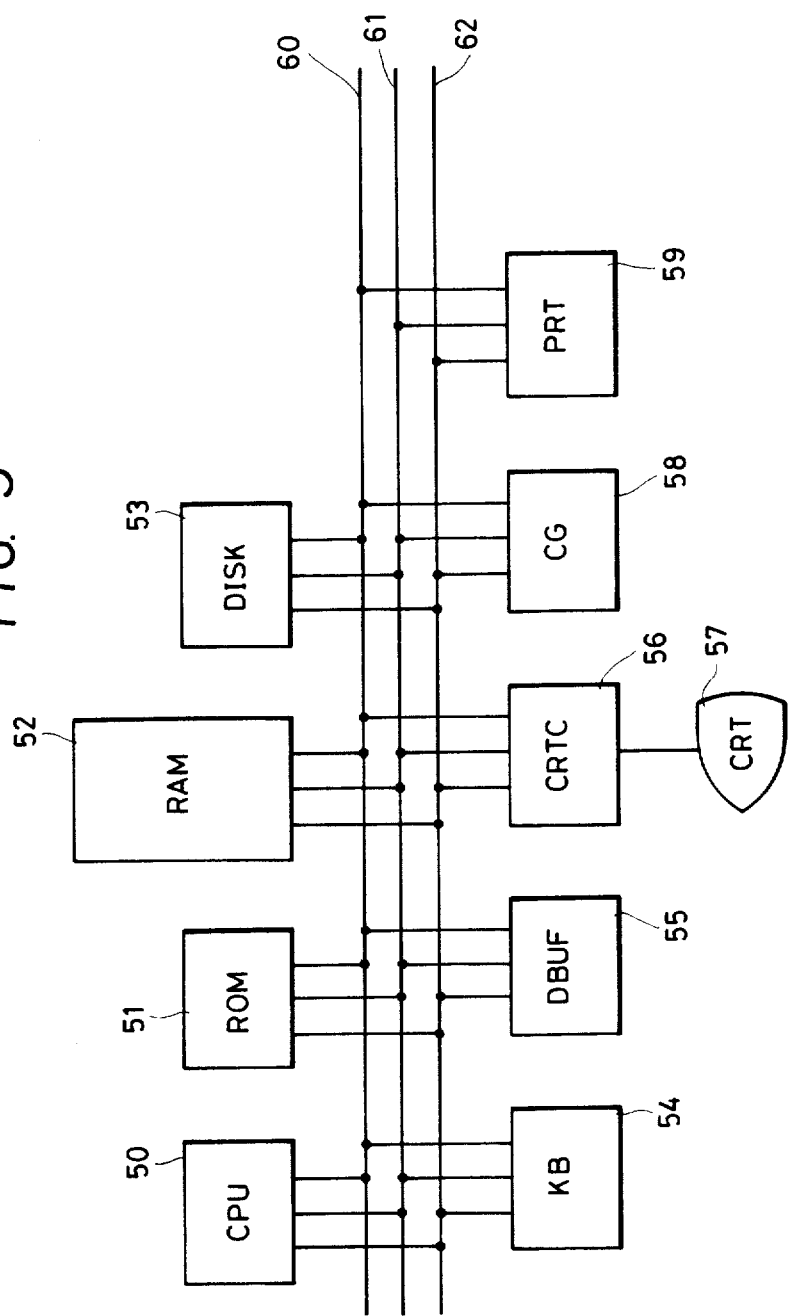
FIG. 5 is a block diagram of a document processing system present invention.

FIG. 5 is a block diagram of the hardware of an embodiment of the invention. This embodiment has a central processing unit (referred to as CPU hereinafter) 50 such as a microprocessor. The CPU 50 is adapted to conduct computations and logical judgments, and to transfer various control signals and data to various devices over a control signal line 60, an address BUS 61 and a data BUS 62. A read-only memory (referred to as ROM hereinafter) 51 stores as fixed data a program of the sequence of control to be performed by the CPU 50. A random-access memory (referred to as RAM hereinafter) 52 is used as a work storage area for various purposes. An auxiliary storage means (DISK) 53 such as a floppy disk is used for the purpose of storage of document data. The entry of data such as character data is conducted through a keyboard (KB) 54.

Reference numeral 55 denotes a data buffer (DBUF) for temporarily storing the input document information or data. A display controller CRTC 56 is adapted to control the display on a display device (CRT) 57, so as to enable the CRT 57 to display document data sent from the CPU 50. A character generator CG 58 stores dot patterns corresponding to character codes. The printing is conducted by a printer PRT 59 such as a wire dot-matrix printer, impact printer, or an ink jet printer.

Figure 6:
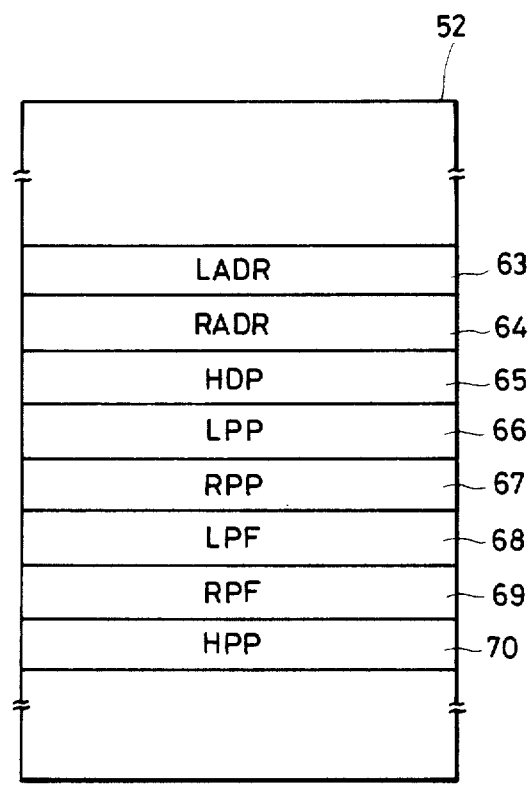
FIG. 6 is an illustration of a portion of a RAM.

Referring now to FIG. 6, the RAM 52 has a pointer LADR 63 for appointing the reading address of left page document data which is to be printed on the left page from among the data stored in the document memory, and a pointer RADR 64 for appointing the reading address of right page document data which is to be printed on the right page. A symbol HDP 65 represents an area for holding the current position of the printhead during printing. Symbols LPP 66 and RPP 67 represent, respectively, pointers pointing to the line print positions on the left and right pages. The area HDP 65 and the pointers LPP 66, RPP 67 store the described position data in the form of distances from the print start position on the paper in terms of the dot pitch. Symbols LPF 68 and RPF 69 denote, respectively, flags which indicate whether printing on the left and right pages is necessary.

Figure 7:
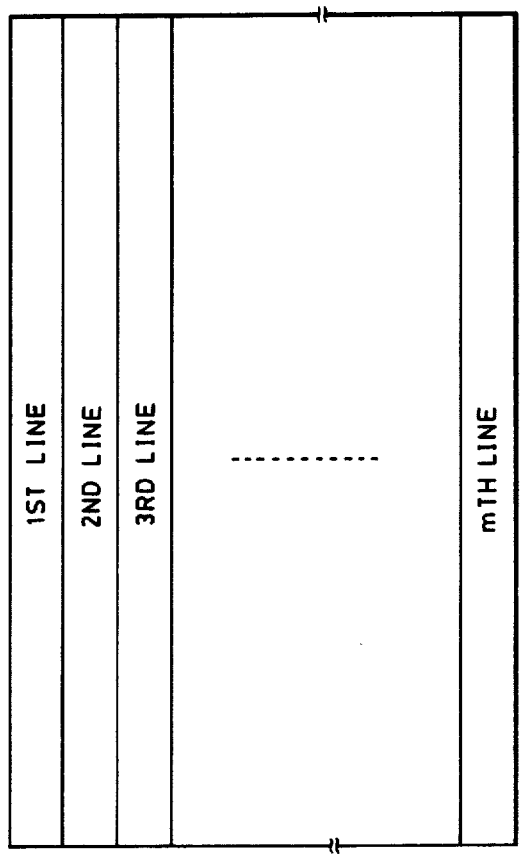
FIG. 7 is an illustration of a manner of storage of document data in a document memory.

Details of the data buffer (DBUF) 55 will now be described with reference to FIGS. 7 and 8. FIG. 7 shows the construction of the document data stored in the data buffer 55.

The document data is handled in the form of a plurality of lines of data (that is, line data) of document information or data, each line containing a predetermined number of character data items. A page of data (that is, page data) is constituted by a number of lines of data which is allocated to each page beforehand. However, when paginating line data exists, that is, data that indicates that a new page of data is to begin, the page data is constituted by the line data preceding occurrence of storage paginating data, even though the number of the lines in such a page data is less than the number of lines that can be allocated to the page.

Figure 8:
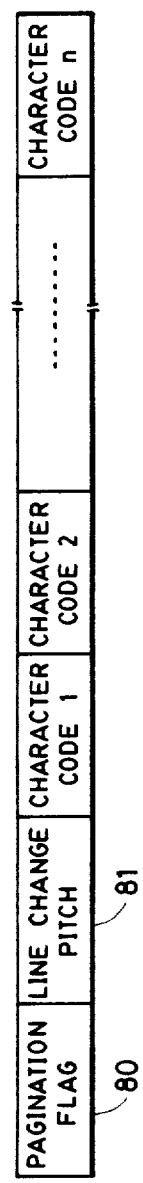
FIG. 8 is an illustration of a construction of line data.

FIG. 8 shows details of the line data. The line data is constituted by a pagination flag 80 which indicates whether the line data is paginating line data, a line change pitch 81 which indicates the pitch of a line change during printing, and character codes 1 to n which conform to the JIS C 6226 codes. In this case, n represents the number of characters on one line.

A description will be made hereinunder of the printing operation, with reference to FIGS. 9 to 15.

Figure 9:
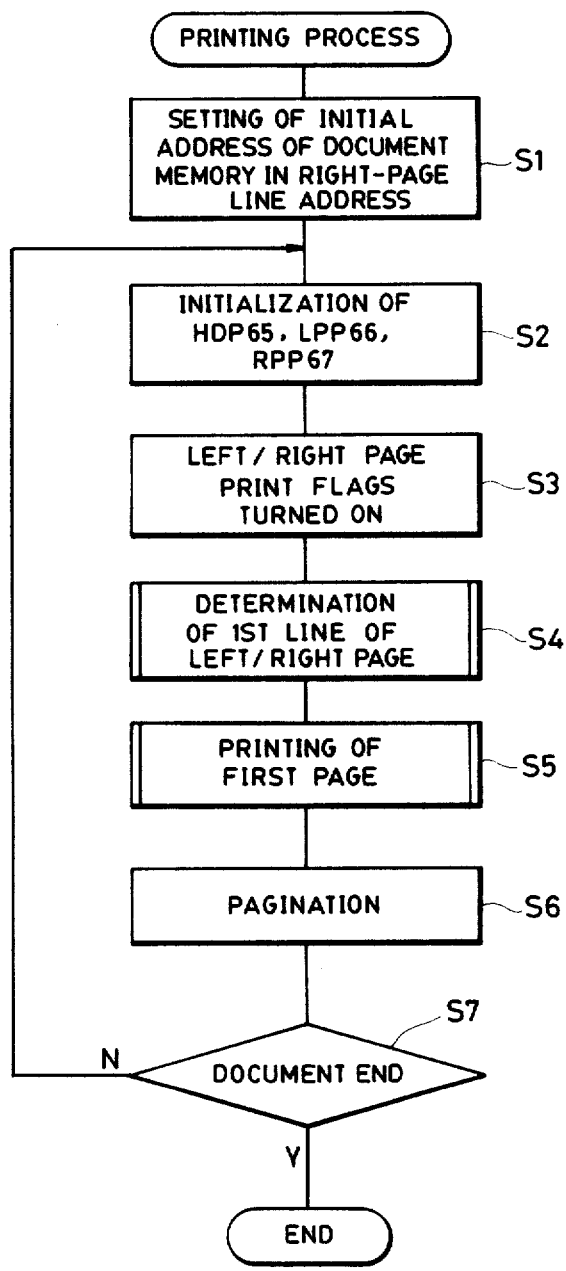
FIGS. 9 to 13 are flow charts showing the printing process in the French-fold printing mode

Referring first to FIG. 9, when the French-fold printing process is started, the initial address of the data buffer DBUF 55 is stored as an initial value in the right page line address RADR 64, in Step S1. Then, in Step S2, "0" is set as an initial value in each of pointers HDP 65, LPP 66 and RPP 67, thereby initializing the pointers. In Step S3, "1" is input to the flags LPF 68 and RPF 69, turning these flags on so that they indicate that the document is being processed with the French-fold format. In Steps S4 and S5, the first line data for the left and right pages is printed on the left page and the right page, respectively. After the completion of the printing as far as the last line, pagination is conducted in Step S6. If the end of the document has not yet been reached at Step S7, the process returns to Step S2 and the steps explained before are repeated. The French-fold printing process is completed when the judgment in Step S7 determines that the end of the document has been reached.

Figure 10:
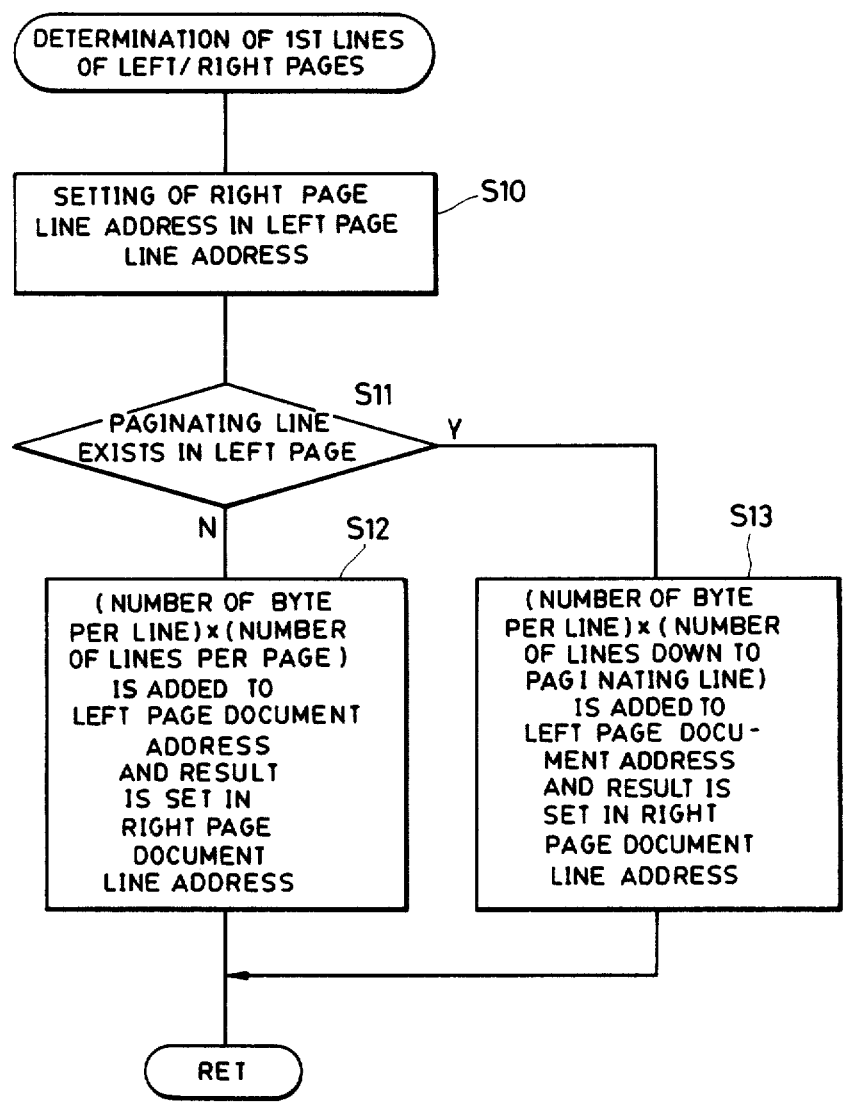

A description will be made hereinafter with specific reference to FIG. 10, of the process of determining the initial addresses of the document data on the left and right pages. The RADR 64 stores the initial address of the document data which are to be printed next. The value of this address is set in the LADR 63 in Step S10. Then, in Step S11, the states of the paginating flags in the line data of the number of lines to be contained in the page are examined, starting from the line corresponding to the address set in LADR 63. If there is no paginating line, i.e., a line with a set paginating flag, the process proceeds to Step S12 in which the sum of the value in LADR 63 and the product of the number of bytes in each of the line data and the number of lines per page is stored in the RADR 64. However, if there is a paginating line, the process proceeds to Step S13 in which the sum of contents of the LADR 63 and the product of the number of bytes in one line of data and the number of lines down to the paginating line is computed and stored in the RADR 64.

A description will be made hereinunder of the process of printing the document data on each page, conducted in Step S5.

Figure 11:
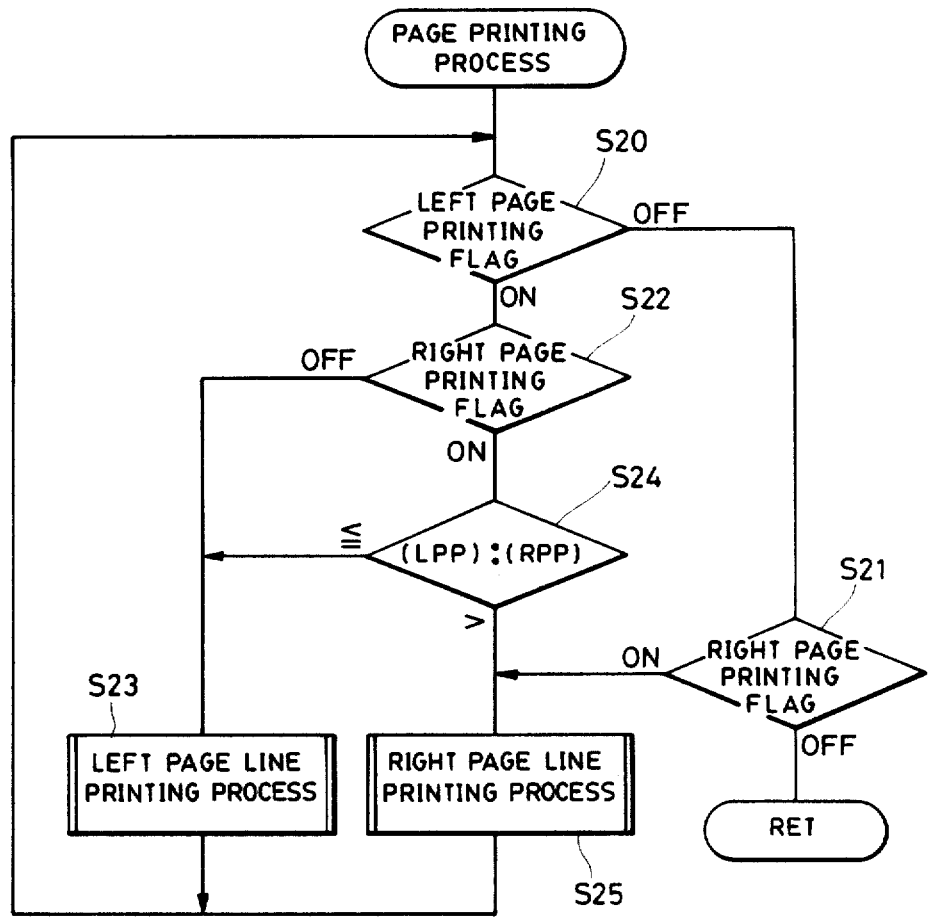
Figure 14:
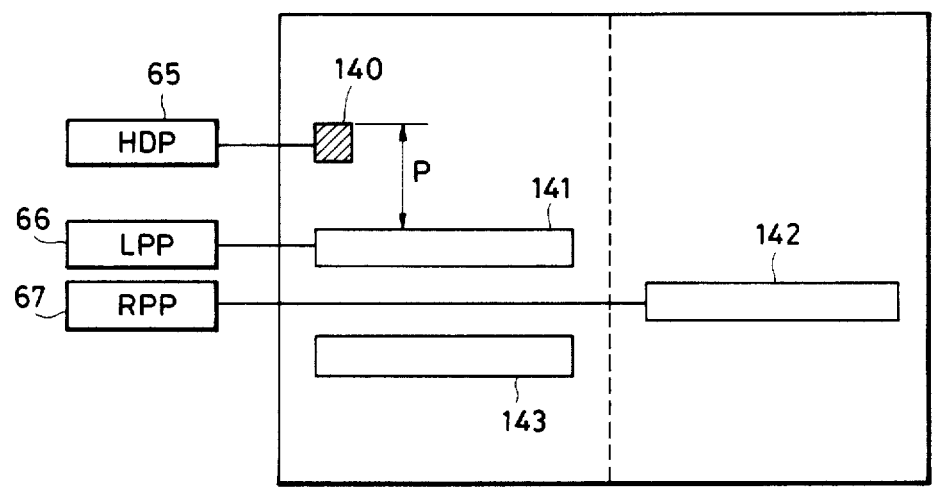
FIGS. 14 and 15 are illustrations of examples of printing operations in accordance with the invention.

Referring to FIG. 11, the left page printing flag LPF 68 is examined in Step S20. If this flag is off, the process proceeds to Step 21 in which the state of the right page printing flag RPF 69 is examined. If both flags are off, the system judges that the printing on the left and right pages is finished, so that the process is completed. If either one of the flags is on, the line data of the corresponding page is printed in Step S23 or S25. If both flags are on, the printing starts with the line data which is in the highest position in the vertical direction, i.e., a direction of auxiliary scanning, as seen in FIG. 14. For this purpose, the process proceeds to Step S24 in which the values of the LPP 66 and RPP 67 are compared, and starts with the line data which corresponds to the pointer with the smaller value.

Figure 12:
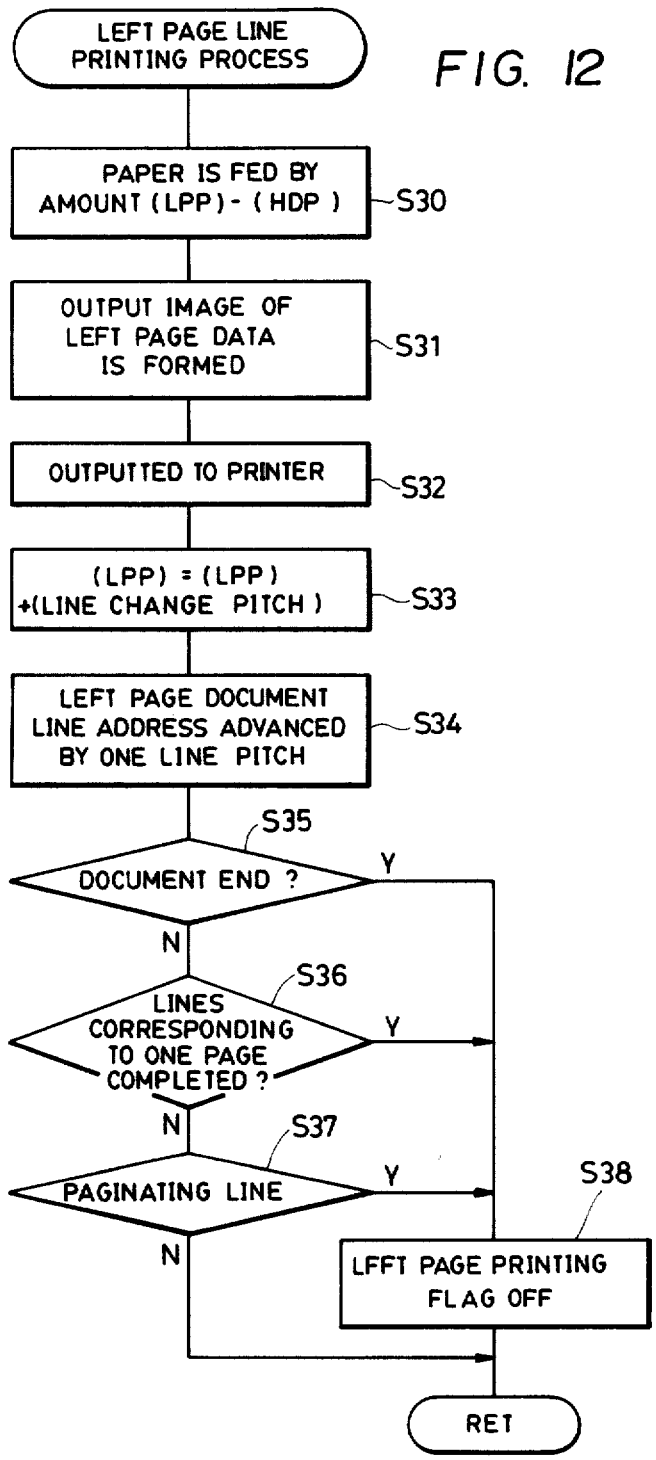

FIG. 12 shows the flow of the left page printing process conducted in Step S23. In Step S30, the print paper is fed by a distance which is determined as the number of dot pitches corresponding to the distance between the current printhead position HDP 65 and LPP 66. Then, in Step S31, the character codes in the line data appointed by the LADR 63 are developed into the corresponding dot patterns so that an output image of one print line is formed. In Step S32, this image is output to the printer so that the printing is executed and followed by a line feed. After the completion of the printing, the process proceeds to Step S33 in which the value of the line change pitch 81 of the line data immediately after the printing is input to the LPP 66, thereby renewing the contents of the LPP 66 to enable it to point the line on the left page document to be printed. Then, in Step S34, the number of bytes in one line is added to the contents of the LADR 63 so as to advance it by one line.

In Step S35, a judgment is conducted as to whether the end of the document has been reached. If the end of the document has been reached, the process proceeds to Step S38 in which the LPF 68 is turned off, thereby indicating the completion of the printing of the left page. Step S38 is executed also when the completion of printing of one page is confirmed through a check conducted in Step S36. In Step S37, a judgment is conducted as to the state of the pagination flag 80 of the line whose printing was completed in Step S32. If this flag is on, the process proceeds to Step S38 which terminates the process after clearing the LPF 68.

Figure 13:
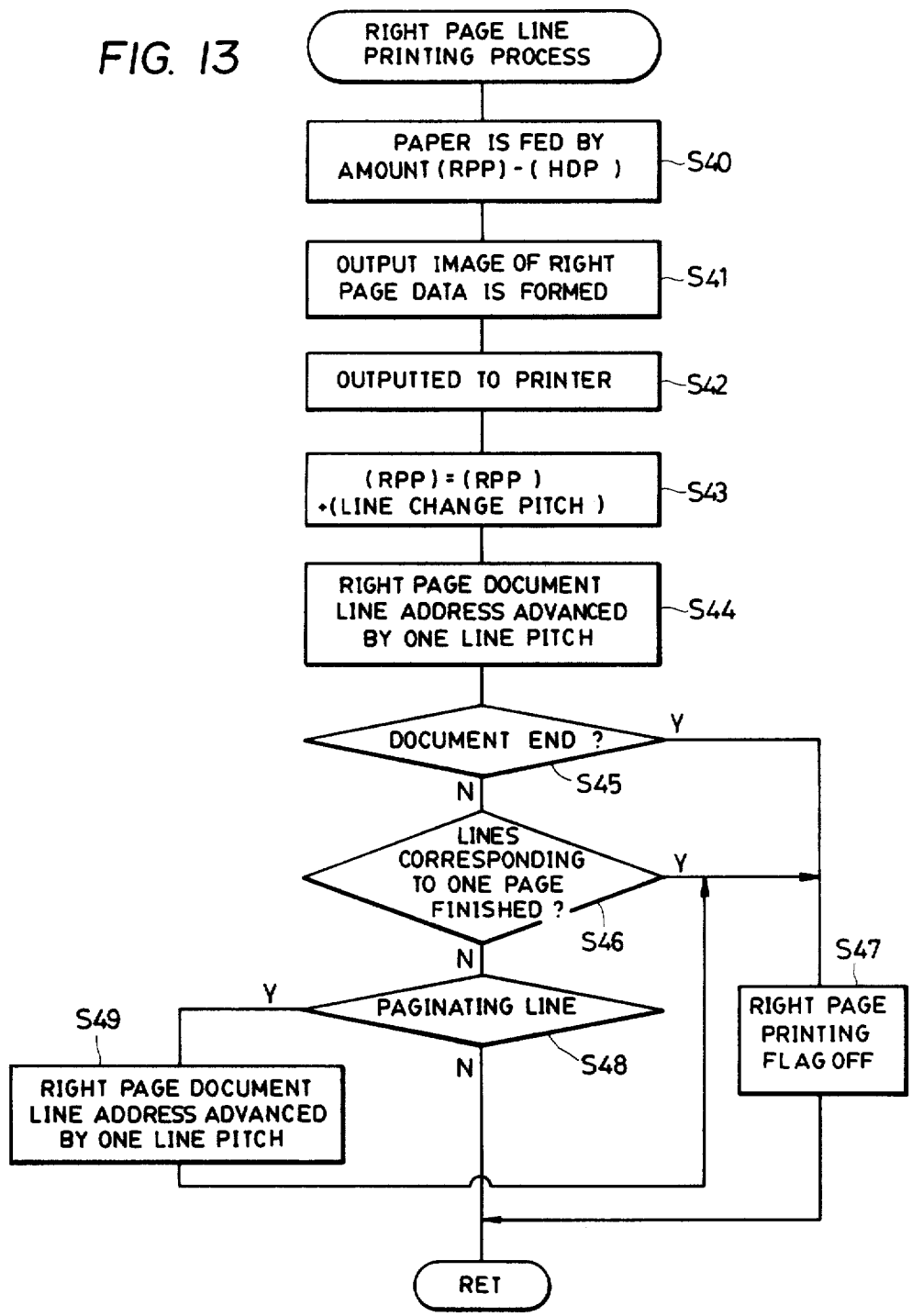

FIG. 13 shows the process for executing printing of the right page. Steps S40 to S44 of this process are materially identical to Steps S30 to S34 of the left page printing process explained in connection with FIG. 12. The process proceeds to Step S47 when the end of the document is confirmed in Step S45 or when completion of printing of lines of one page is confirmed in Step S46. In Step S47, the process is completed after the RPF 69 is turned off. However, if neither the end of the document nor the completion of printing of all lines is confirmed, the process proceeds to Step S48. If the line printed in Step S42 is a paginating line, the process then proceeds to Step S47 after increasing the content of RADR 64 by a number corresponding to one line.

Figure 15:
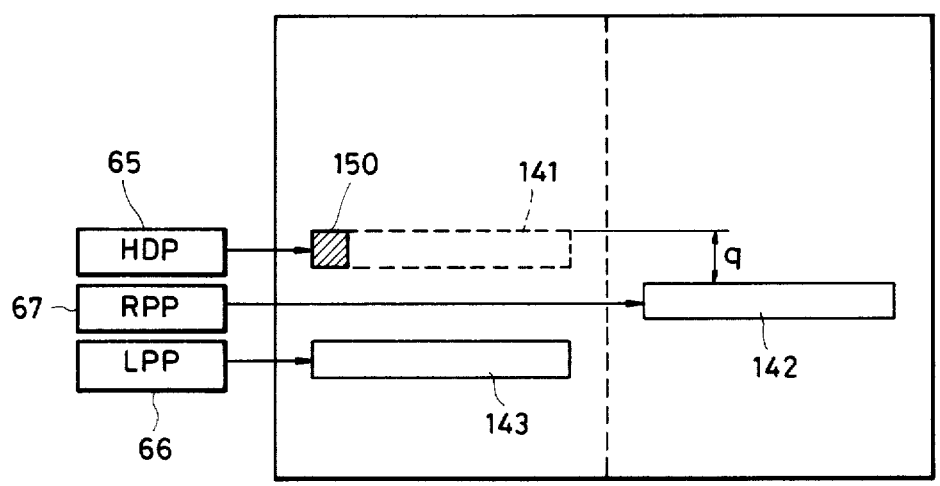

FIGS. 14 and 15 show an example of the printing operation performed by the described embodiment in accordance with the flow charts explained hereinbefore. Referring first to FIG. 14, the current position of the printhead is denoted by a numeral 140. A numeral 141 designates a left page line which is to be printed next, 142 denotes a right page line which is to be printed next, and 143 denotes a line which is to be printed after the printing of the line 142.

In this case, the value of the LPP 66 is greater than that of the RPP 67, so that the left page line 141 is above the level of the right page line 142. To begin the printing, the paper is fed by an amount equal to the difference P between the HDP 65 and the LPP 66. Namely, the printhead is moved relative to the print paper to the position appointed by the LPP 66. FIG. 15 illustrates the state of the system after the completion of the printing of the line 141 and the subsequent update of the contents of the pointers. In this state, the values of the HDP 65 indicating the printhead position has been updated to 150 which points to the starting end of the line 141 which has just been printed, while the value of the LPP 66 has been updated to point the position of the left page line 143 to be printed next. In this state, the value of the RPP 67 is less than that of the LPP 66, so that the process proceeds from Step S24 to S25, thereby starting the printing of the line 142 on the right page. The printing is started, in the same way as in the case of the printing of the left page, by first feeding the paper by an amount q which is the difference between RPP and HDP (q=RPP−HDP), and then by conducting printing the line 142.

As will be understood from the following description, according to the invention, French-fold printing is executed even when the line changing pitches of the two pages are different.

This, however, presents a new problem in that the printing of the left page lines and the printing of the right page lines are conducted separately, necessitating two printing operation cycles even when a left page line and a right page line are aligned with each other, with the result that printing efficiency is impaired. In order to obviate this problem, it is advisable that, when a left page line and a right page line are aligned with each other, these lines are regarded as being a single continuous line and the characters of such a single line are developed into dot patterns at the same time, so that the printer can print the left page line and the right page line in one printing stroke, whereby the reduction in the printing efficiency is minimized.

Another embodiment of the invention will be explained hereinunder, with specific reference to FIGS. 6 and 16. In this embodiment, the RAM 52 has a pointer HPP 70 which stores the printhead position in the horizontal direction. After the completion of the printing of a line, the value of the HPP 70 is updated so that it points to the end position of the printed line. Then, to print the next line on the left or the right page, the printhead is directly moved from the current position to the start position of the next line to be printed. This manner of printing, usually referred to as "minimal distance printing", provides a higher printing efficiency than the ordinary printing method which requires a carriage or printhead return upon the completion of the printing of each line. In this embodiment, minimal distance printing is realized by forming the output image of the line data in Step S31 or S41 (see FIG. 12 or 13), computing the horizontal distance between the current printhead position indicated by the HPP 70 and the start end position of the line to be printed next, driving the printhead in the forward or backward direction by the computed amount, and giving a printing instruction in Step S32 or S42.

Figure 16:
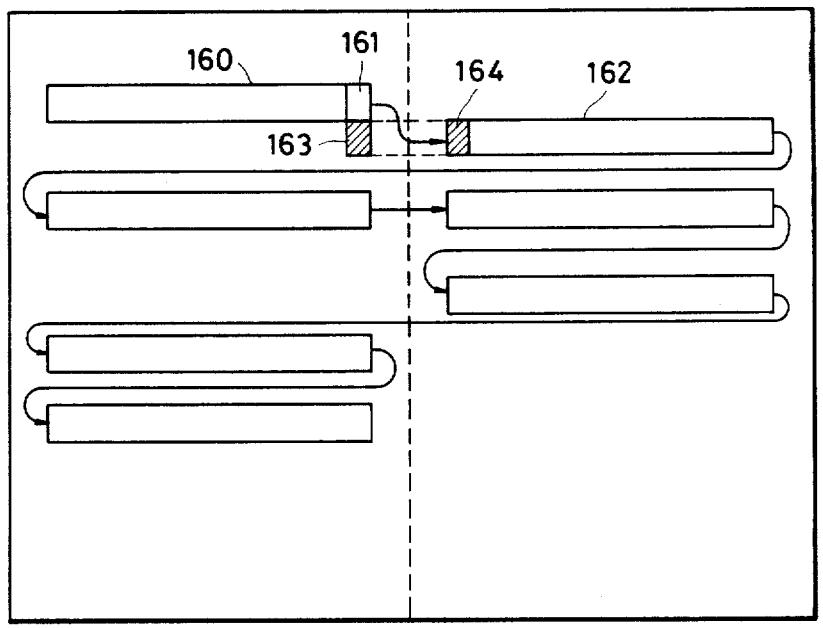
FIG. 16 is an illustration of an example of a printing sequence in another embodiment.

FIG. 16 illustrates an example of the printing sequence explained above. After the printing of a first line 160 on the left page, the printhead stops at the right-hand end 161 of that line 160. In this state, the HPP 70 points to 161. Then, for printing the first line 162 of the second page, the paper is fed to a position 163 and the printhead is moved from the current position to the left end 164 of the line 162, therey starting printing of this line. The printhead is then moved as indicated by arrows, thereby to complete the printing in the minimal time.

In the embodiments described hereinbefore, the printing can be conducted with free and independent choice of the line pitchs in both pages, without requiring any large-capacity image memory. This enables the user to freely appoint line change for each line in left and right pages, even when the printing is to be executed in the French-fold printing mode.

Figure 17:
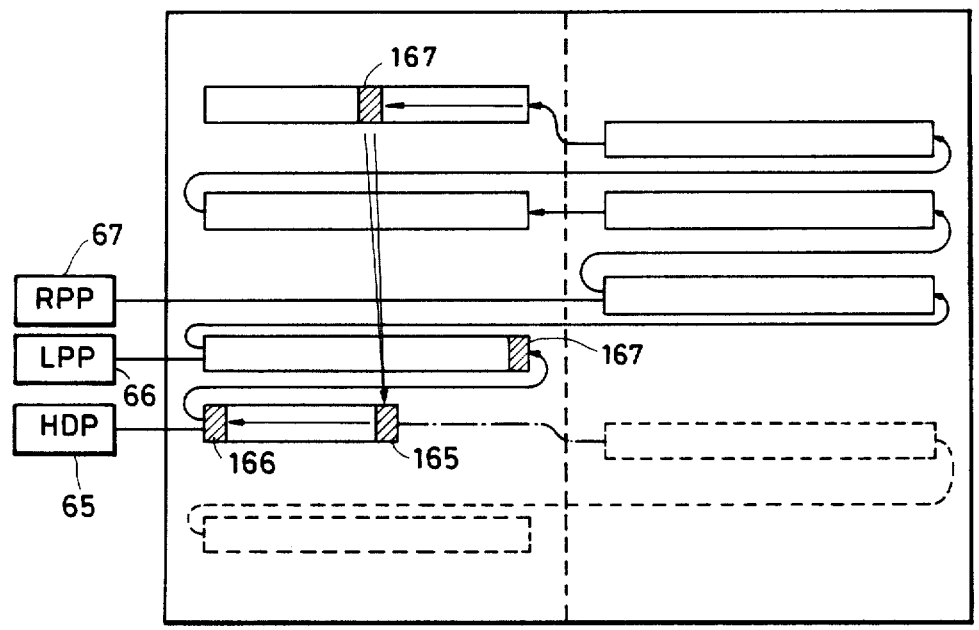
FIG. 17 is an illustration of a backward tracing operation of the printhead.

FIG. 17 illustrates a manner in which backward tracing is conducted during printing in the French-fold printing mode so as to move the printhead from the current position to a desired position 167 where printing has already been executed. In this Figure, full lines show the lines which have been already printed, while broken lines show lines where the printing has not been conducted yet. The current position of the printhead is designated by the numeral 165.

Figure 18:
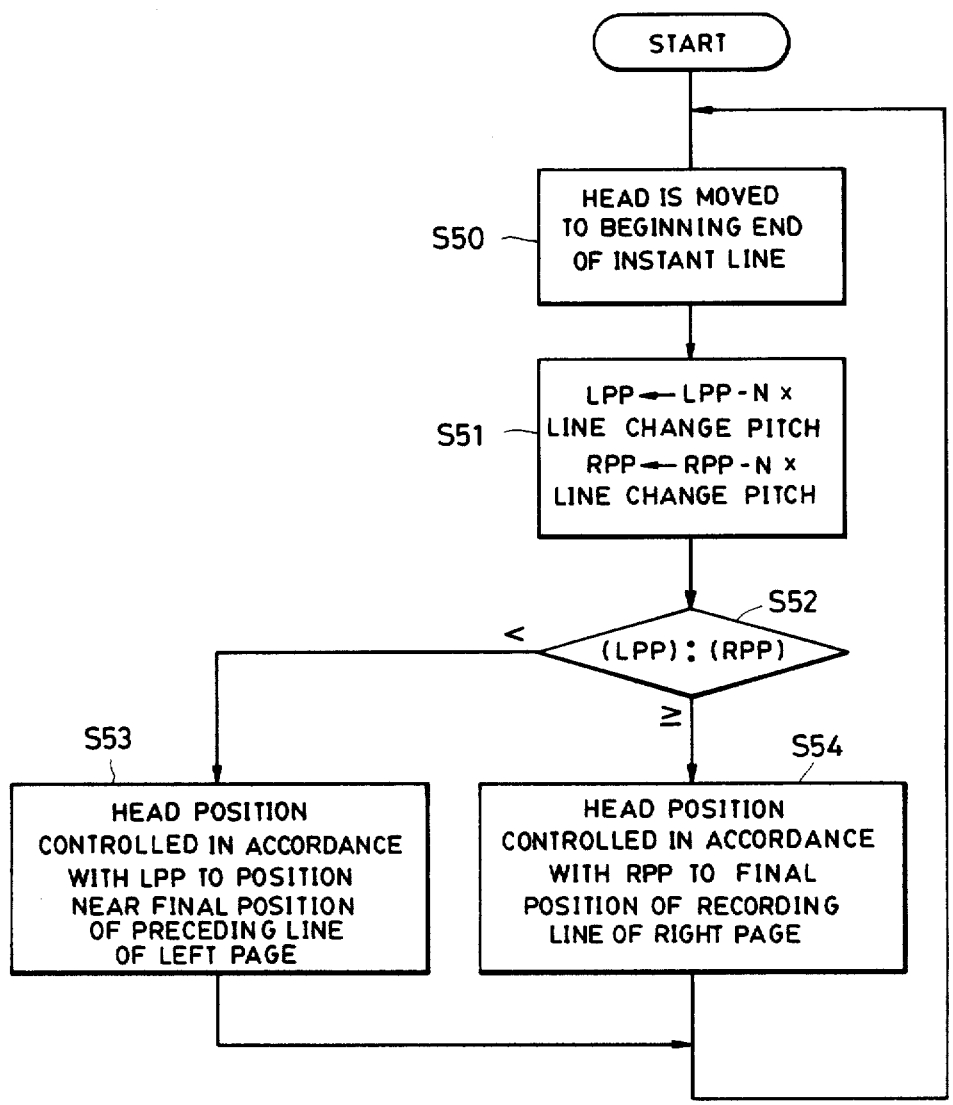
FIG. 18 is a flow chart of the backward tracing operation.

FIG. 18 shows a basic control flow chart for the backward tracing. In Step S50, the printhead is moved to the starting end or its vicinity of the line on which the printhead is positioned. Then, the process proceeds to Step S51 so as to appoint the position in the preceding line by the pointers LPP and RPP. A symbol N apearing in Step S51 represents a correction term. When, for example, the printhead is located on the left page, the correction term N is represented as N=2 for the LPP, because the next line is appointed in Step S33 in FIG. 12. Similarly, in the case of the initial state in the operation illustrated in FIG. 17, N is given as N=1 for the RPP. Needless to say, the data concerning the current position 165 of the printhead and the values of the LPP and RPP are held during the backward tracing.

In Step S52, an operation is conducted to find a left page preceding line or a right page preceding line which is the closest to the line on which the printhead is positioned. In the state shown in FIG. 17, the preceding line in the left page is the closet to the line on which the printhead is positioned. In consequence, the head is located in the vicinity of the position 167. Similarly, the flow chart shown in FIG. 18 is traced backward as indicated by arrows in FIG. 17, as long as a back trace key (not shown) is in the depressed state or an instruction is given to repeat this operation. The process comes off the loop shown in FIG. 18 by, for example, interruption, when the printhead has reached the first printed line or when the back trace key is turned off.

Thus, the printhead is located, for example, at the position 167 in the printed line, and various editing works such as erasure of the printed characters, synthesis of a character, halftone printing, pattern printing and so forth are conducted.

When a relocation key (not shown) is depressed, the distance between the position 167 and the position 165 is computed both in the line and column directions, and the printhead is returned to the position 165 as indicated by a thick arrow. In this case, the printhead travels obliquely across the lines.

The arrangement may be such that the content of the LPP and the content of the RPP are counted independently so that the backward tracing is effected in the left and right pages independently or successively through the two pages, while ensuring correct resetting of the printhead to the position before the backward tracing by the relocating function.

It is also possible to provide a suitable switching means which conducts a switching between a first mode in which the backward tracing is carried out over the entire area of the paper sheet, i.e., throughout two pages as shown in FIG. 17 and a second mode in which the backward tracing is effected separately on two pages.

It will be seen that, according to the invention, French-fold printing can be conducted even when the lines are arranged at different pitches on both pages, and a backward tracing function and a relocating function may be performed to enable the user to effect any desired editing work.

As has been described, the document processing system of the present invention permits the user to manage the printing positions of lines in different blocks of a document independently and to choose the line changing pitch for each of the lines.

In addition, in the document processing system of the invention, it is possible to move the printhead to any desired position on a line that already has been printed, through the block in which the desired position is included or through another block or blocks.

In addition, the relocation of the printhead from a position on a line already printed to the position from which the backward tracing was commenced can be done through the block in which the first-mentioned position exists or through another block or blocks.

By virtue of these features, the printhead in the document processing system of the invention can freely move between and through blocks of different formats, thereby assuring high speed and ease of the editing operation.

What is claimed is:

1. A document processing system comprising:
input means for inputting into said system document information, including line pitch information relating to lines of the document information, the document information being divided into at least two regions;
document memory means for storing said document information;
line pitch information memory means for storing a plurality of line pitch information relating to the lines of said document information in each of the regions;
first deriving means for deriving, in accordance with said line pitch information relating to one of the regions, a position of the line to be printed subsequently in said one of the regions;
second deriving means for deriving, in accordance with said line pitch information relating to the other one of the regions, a position of the line to be printed subsequently in said other one of the regions;
deciding means for deciding the sequence of printing of the lines in accordance with information each of said position information derived respectively by said first and second deriving means regardless of the region to which each line belongs, so as to minimize the time needed for printing the document information; and
printing means for effecting printing in accordance with the sequence decided by said deciding means.

2. A document processing system according to claim 1, wherein said deciding means decides the sequence of printing in the direction perpendicular to the direction of the lines.

3. A document processing system according to claim 1, wherein said document memory means can store document information that includes at least character information.

4. A document processing system comprising:
memory means for storing document information in relation to a printing format, said document information being divided into a plurality of blocks, with each block containing a plurality of lines;

print head means, movable in a first direction, for printing document information;

feed means for feeding a recording medium in a second direction generally perpendicular to the first direction;

position memory means for storing a position where said print head means is currently positioned;

pitch memory means for storing a plurality of line pitch information associated with each of the plurality of blocks;

judging means for determining the line to be printed in any of said blocks by said print head means which is nearest in the second direction to the line on which said print head means is positioned in accordance with the position information stored in said position memory means and the plurality of line pitch information stored in said pitch memory means so that movement of said print head means is minimized; and printing control means for controlling said print head means and said feed means in accordance with the result of the determination made by said judging means so as to enable the document information to be printed in the nearest line, after completion of the printing of the document information in the line on which the print head means is positioned.

5. A document processing means according to claim 4, wherein said judging means determines the presence of substantially corresponding lines in said blocks.

6. A document processing means according to claim 4, wherein said printhead means prints the plurality of lines appearing in the second direction.

7. A document processing means according to claim 4, wherein said memory means stores document information including at least character information.

8. A document processing system comprising:

a head means, movable relative to a medium on which document information is to be printed, for printing document information in lines divided into a plurality of blocks on the medium;

line pitch information memory means for storing a plurality of line pitch information relating to the lines of the document information in each of the blocks;

head position instructing means for generating instructions for locating said head means at a desired position in the printed portion of a line of document information on which said head means is already located or on a line of document information previously printed, and for selecting one of a first mode in which said head means is moved to said desired position only across the block in which said head means is positioned and a second mode in which said head means is moved across a plurality of blocks; and head position control means operable in response to an instruction generated by said head position instructing means so as to move said head means to said desired position at least across one of the block of document information in which said head means is positioned and across a plurality of blocks of document information in accordance with the plurality of line pitch information stored in said line pitch information memory means so that movement of said head means is minimized.

9. A document processing system according to claim 8, wherein said head means prints document information including at least character information.

10. A printing apparatus capable of printing lines of information with variable line pitch comprising:

head means movable in a first direction along a medium for printing document information in lines divided into a plurality of blocks on the medium;

line pitch information memory means for storing a plurality of line pitch information relating to the lines of the document information in each of the blocks;

feed means for feeding the medium in a second direction perpendicular to the first direction;

relocating instruction means for generating, after said head means is moved to a desired position in a line which has previously been printed, a relocating instruction for relocating said head means to the position where said head means was positioned before being moved to the desired position; and control means operable in response to the relocating instruction from said relocating instruction means to control movement of said head means in the first direction and the feed of the medium in the second direction by said feed means in accordance with the plurality of line pitch information stored in said line pitch information memory means thereby relocating said head means regardless of the sequence of printing of lines in said plurality of blocks, so that movement of said head means is minimized.

11. A document processing means according to claim 10, wherein said head means prints document information including at least character information.

12. A document processing system according to claim 10, wherein said head means includes deciding means for deciding the sequence of printing of lines across said plurality of blocks in accordance with a predetermined printing mode.

* * * * *

UNITED STATES PATENT AND TRADEMARK OFFICE
CERTIFICATE OF CORRECTION

PATENT NO. : 4,914,621
DATED : April 3, 1990
INVENTOR(S) : Tomio Mashiyama

It is certified that error appears in the above-identified patent and that said Letters Patent is hereby corrected as shown below:

COLUMN 2:
    Line 60, "system present" should read --system emobodying the present--.

Line 66, "mode" should read --mode;--.

COLUMN 6:
    Line 63, "therey" should read --thereby--.

COLUMN 8:
    Line 50, "information" should be deleted.

UNITED STATES PATENT AND TRADEMARK OFFICE
CERTIFICATE OF CORRECTION

PATENT NO. : 4,914,621

DATED : April 3, 1990

INVENTOR(S) : Tomio Mashiyama

It is certified that error appears in the above-identified patent and that said Letters Patent is hereby corrected as shown below:

<u>COLUMN 9</u>:

Line 29, "document processing means" should read --document processing system--.

Line 32, "document processing means" should read --document processing system--.

Line 35, ""document processing means" should read --document processing system--.

Signed and Sealed this

Twenty-first Day of July, 1992

*Attest:*

DOUGLAS B. COMER

*Attesting Officer*     *Acting Commissioner of Patents and Trademarks*